(12) United States Patent
Chechik

(10) Patent No.: US 9,009,188 B1
(45) Date of Patent: Apr. 14, 2015

(54) DRAWING-BASED SEARCH QUERIES

(75) Inventor: Gal Chechik, Rinatia (IL)

(73) Assignee: Google Inc., Mountain View, CA (US)

( * ) Notice: Subject to any disclaimer, the term of this patent is extended or adjusted under 35 U.S.C. 154(b) by 163 days.

(21) Appl. No.: 13/494,156

(22) Filed: Jun. 12, 2012

(51) Int. Cl.
*G06F 17/30* (2006.01)
*G06K 9/60* (2006.01)
*G06K 9/46* (2006.01)

(52) U.S. Cl.
CPC ............ *G06F 17/30247* (2013.01); *G06K 9/46* (2013.01); *G06F 17/30277* (2013.01)

(58) Field of Classification Search
CPC .................... G06F 17/30247; G06F 17/30277; G06K 9/46
USPC .......................................... 382/305; 707/769
See application file for complete search history.

(56) References Cited

U.S. PATENT DOCUMENTS

| 5,751,286 | A  | * | 5/1998  | Barber et al. ................ 715/835 |
| 7,890,499 | B1 | * | 2/2011  | Boswell ........................ 707/722 |
| 7,949,191 | B1 | * | 5/2011  | Ramkumar et al. .......... 382/209 |
| 7,961,986 | B1 | * | 6/2011  | Jing et al. ..................... 382/305 |
| 2002/0168117 | A1 | * | 11/2002 | Lee et al. ..................... 382/305 |
| 2003/0236778 | A1 | * | 12/2003 | Masumoto et al. ............... 707/3 |
| 2008/0219596 | A1 | * | 9/2008  | Shiitani et al. ................ 382/306 |
| 2009/0234820 | A1 | * | 9/2009  | Kaburagi et al. ................. 707/3 |
| 2010/0185615 | A1 | * | 7/2010  | Monga .......................... 707/736 |
| 2011/0258222 | A1 | * | 10/2011 | Park et al. ..................... 707/769 |

* cited by examiner

*Primary Examiner* — Jorge A Casanova
(74) *Attorney, Agent, or Firm* — Fish & Richardson P.C.

(57) ABSTRACT

Methods, systems, and apparatus, including computer programs encoded on a computer storage medium, for processing drawing-based search queries. In one aspect, a method includes receiving search request data specifying a search request, the search request comprising a drawing represented by a set of line strokes, each line stroke representing a trace of a moving input point; identifying line segments from the line strokes; comparing the identified line segments to reference line segments, each of the reference line segments representing a portion of a corresponding reference drawing; identifying a candidate reference drawing based on the comparison of the identified line segments with reference line segments; identifying a keyword for the candidate reference drawing, the keyword being a term determined to be relevant to a subject matter of the candidate reference drawing; and in response to receiving the search request, providing search results data specifying search results responsive to the keyword.

27 Claims, 6 Drawing Sheets

ND search queries, rather than a text-based search query. A drawing-based search

DRAWING-BASED SEARCH QUERIES

BACKGROUND

The Internet provides access to a wide variety of resources, for example, video files, image files, audio files, or Web pages. Such resources can include content associated with particular subjects, book articles, or news articles. A search system can select one or more resources in response to receiving a search query. A search query can be data that a user submits to a search engine, e.g., a search engine of a search system, to satisfy the user's informational needs. A search query is usually in the form of text, e.g., one or more query terms. In response to receipt of a search query, the search system selects and scores resources based on their relevance to the search query and their importance relative to other resources to provide search results that link to the selected resources. Search results are typically presented in an ordered list that is determined based on the scores.

SUMMARY

This specification describes technologies relating to search queries.

In general, one aspect of the subject matter described in this specification can be embodied in methods that include the actions of receiving search request data specifying a search request, the search request comprising a drawing represented by a set of line strokes, each line stroke representing a trace of a moving input point; identifying line segments from the line strokes in the set; comparing the identified line segments to reference line segments, each of the reference line segments representing a portion of a corresponding reference drawing; identifying a candidate reference drawing based on the comparison of the identified line segments with reference line segments representing the candidate reference drawing; identifying a keyword for the candidate reference drawing, the keyword being a term determined to be relevant to a subject matter of the candidate reference drawing; and, in response to receiving the search request, providing search results data specifying search results responsive to the keyword.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. A user can generate a search query in the form of a drawing-based search query, rather than a text-based search query. A drawing-based search query is a drawing input by a user to be used as the basis search query, which is automatically transformed into a text-based search query. This allows the user to graphically represent the search query with broad finger or stylus strokes on a mobile device's touchscreen and reduces the mistakes and errors commonly associated with typing the characters of a search query on a mobile device with a relatively small touchscreen/keyword, e.g., errors such as unintended keystrokes or nonregistered, intended keystrokes. Avoiding the unnecessary submission of numerous incorrect search queries, e.g., search queries including characters from unintended keystrokes or search queries with absent characters from nonregistered, intended keystrokes, reduces the processing burdens and communication bandwidth requirements on the search system and the mobile device. Additionally, avoiding the unnecessary submission of numerous incorrect search queries reduces user frustration with the search process.

In some scenarios, a user may not recall the specific name, title or description of the subject matter for which the user is intending to search but the user does have a mental picture of the subject matter. In these scenarios, the user can enter and cause the submission of a drawing-based search query to the search system. As the user is not forced to enter multiple text-based search queries guessing at the name or title of the subject matter of the search query, the number of search queries submitted can be reduced. Reducing the number of submitted search queries reduces the processing burdens and communication bandwidth requirements on the search system and the mobile device.

Each of the advantages above is optional and can be achieved separately or in combination.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

Figure 1:
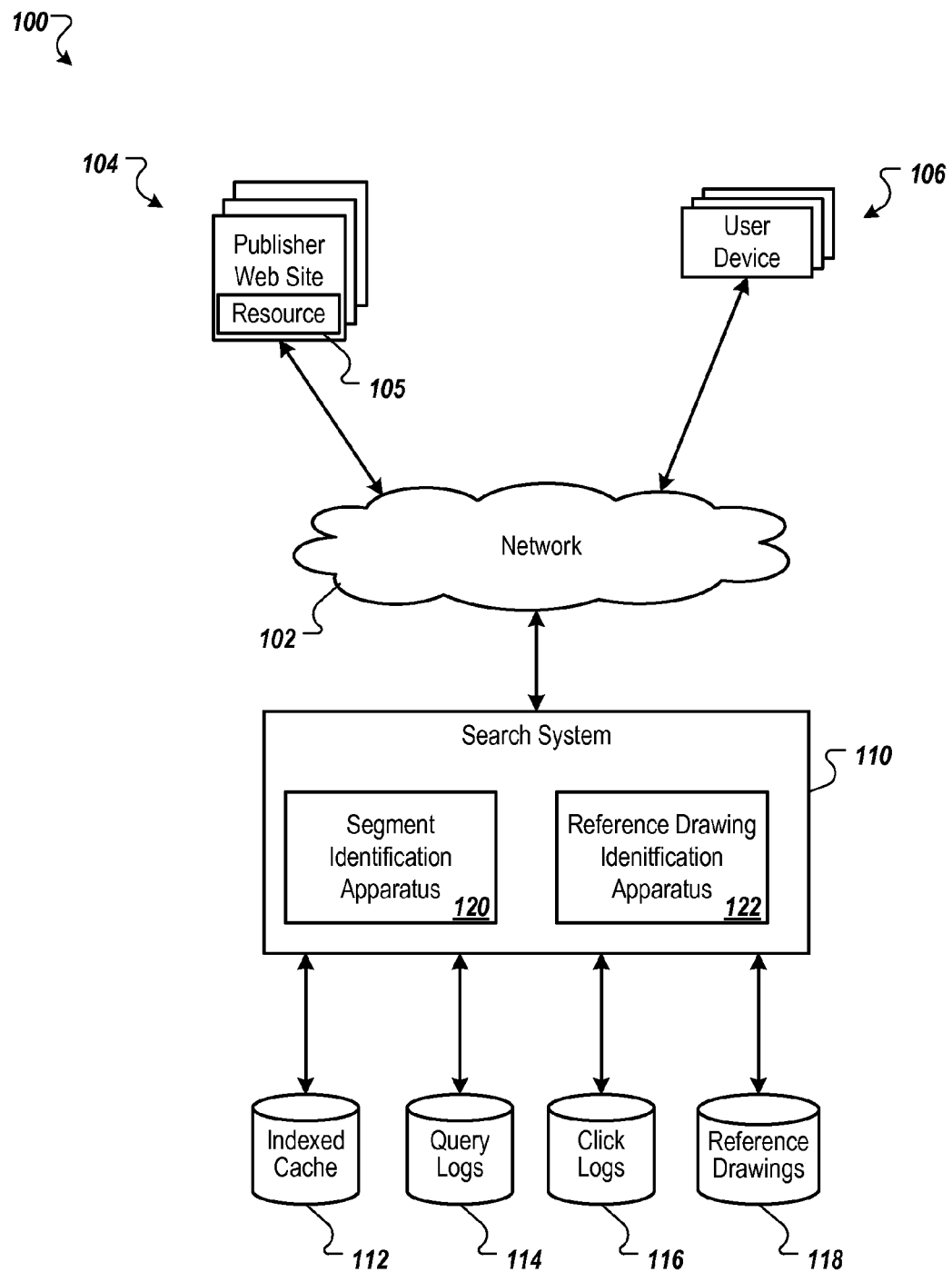
FIG. 1 is a block diagram of an example environment in which a search system provides search services.

Given the proliferation of Internet-capable mobile devices, many search queries are submitted through such mobile devices. However, given the relatively small size of many mobile device touchscreens and keyboards, it can be challenging to enter the desired search query without striking unintended keys, which can result in incorrect search queries. Further, in some scenarios, a user may not recall, for example, the specific name or title of the subject matter, or the spelling of the same, for which the user is intending to search. This can lead to numerous search queries submissions to obtain the desired information even though the user can picture the subject matter of the search in her mind's eye.

To address such issues, this specification describes technologies that relate to generating search results that identify images based on and responsive to a drawing input by a user as a search query, "drawing-based search query." For example, a user can sketch a drawing in a drawing input field of a search system search page presented on the user's user device, e.g., a smartphone. The user can create the drawing, for example, by sketching or tracing the drawing in the drawing input field presented on the user device's touchscreen with the user's finger, a stylus or another input device. For example, if the user is interested in search results related to hearts then the user can sketch an outline drawing of a hearts in the drawing input field and cause the user device to submit the drawing as a search query to the search system.

As the drawing is sketched or otherwise drawn by the user, the drawing is composed of one or more line strokes where each line stroke represents the trace of a moving input point, e.g., the trace of the user's finger on the touchscreen across drawing input field. The search system identifies line segments, e.g., curves and straight lines, from the line strokes composing the submitted drawing and compares these identified line segments with line segments from reference drawings or images stored in a database.

The search system then identifies one or more reference drawings having line segments similar to or matching those of the submitted drawing and, in turn, identifies annotations or keywords associated with the reference drawing(s). For example, the annotations can be annotations of the reference drawing included in the metadata of the data file for the reference drawing. As another example, the annotations can be textual annotations that are provided on a webpage on which the drawing, e.g., image, is uploaded, like a drawing title or drawing caption. The search system uses the identified annotations or keywords as search query terms for a text-based search query to identify search results responsive to the user's submitted drawing, which can then be presented to the user on the user's user device. For clarity, a drawing-based search query is not limited for use in searching for only other drawings, but rather the semantic meaning of the drawing comprising the drawing-based search query is analyzed and corresponding text-based search queries can be submitted to a search system to search for any relevant search result in any media format or presentation-type.

In this way the user can obtain search results relevant to the subject matter of a drawing sketched by the user.

§2.0 Example Environment

FIG. 1 is a block diagram of an example environment 100 in which a search engine 110 provides search services. A computer network 102, such as a local area network, "LAN", wide area network, "WAN", the Internet, or a combination thereof, connects publisher web sites 104, user devices 106, and the search engine 110. The example environment 100 may include many thousands of publisher web sites 104 and user devices 106.

A publisher web site 104 is a one or more web page resources 105 associated with a domain name. A publisher web site 104 can be hosted by one or more servers. An example web site includes a collection of web pages formatted in hypertext markup language, "HTML," that contains text, graphic images, multimedia content, and programming elements, such as scripts. In some implementations, a publisher web site 104 is maintained by a publisher, e.g., an entity that manages and/or owns the web site.

A resource 105 is any data that is provided by a publisher web site 104 over the network 102 and associated with a resource address. For example, resources 105 include HTML pages, word processing documents, portable document format, "PDF," documents, images, videos, and feed sources. The resources 105 can include content, such as, text, pictures, and so on, and may include embedded information, such as meta information, e.g., metadata, and hyperlinks, and/or embedded instructions such as scripts.

A user device 106 is an electronic device that is under the control of a user and capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user device 106 to display text, images, videos, music and other information typically located on a web page at a website on the world wide web or a local area network. In some implementations, a user may be allowed to interact with the displayed content using a user device 106.

To facilitate searching of these resources 105, the search system 110 can identify the resources 105 by crawling the publisher web sites 104 and indexing the resources 105 provided by the publisher web sites 104. The indexed and, optionally, cached copies of the resources 105 can be stored in an indexed cache data store 112.

User devices 106 can submit search queries to the search system 110. The search queries can be submitted to the search system 110 in the form of a search request that includes the search query. In response to the search request, the search engine 110 can use data in the indexed cache data store 112 to identify resources 105 that are relevant to the search queries. The search system 110 identifies the resources 105 in the form of search results and returns the search results to the user devices 106 in a search results page. A search result can be data generated by the search system 110 that identifies a resource 105 that satisfies a particular search query, and includes a resource locator for the resource 105. An example search result can include any, or a combination, of a web page title, a snippet of text extracted from a web page, a thumbnail of an image when the search is for images, and a universal resource locator "URL," of a web page that includes the snippet of text and/or the image.

The search results can be ranked based on scores related to the resources 105 identified by the search results, such as information retrieval, "IR," scores. In some implementations an IR score can be based on a quality of the resource 105 and a relevancy of the resource 105. Various search algorithms can be used to compute these search scores. The search results can be ordered according to these scores and provided to the user device 106 according to the order.

The user devices 106 receive the search results on search results pages and render the pages for presentation to users. In response to a user selecting a search result at a user device 106, the user device 106 requests the resource identified by the resource locator included in the selected search result. The server hosting a publisher web site 104 associated with the resource 105 receives the request for the resource 105 from the user device 106 and provides the resource 105 to the requesting user device 106.

In some implementations, the search queries submitted from the user devices 106 are stored in query logs 114. In some implementations, click data associated with the search queries 109 and the web pages referenced by the search results are stored in click logs 116. Accordingly, the query logs 114 and the click logs 116 can store search history data that include data from and related to previous search requests associated with unique identifiers. The click logs 116 specify actions taken responsive to search results provided by the search system 110. In some implementations, the data stored in the click logs 116 and the query logs 114 are anonymized.

§3.0 Drawing-Based Search Queries

In addition to providing search results in response to text-based search queries, e.g., search queries comprised of text characters entered in a text input field, the search system 110, by use of a segment identification apparatus 120, a reference drawing identification apparatus 122 and reference drawings in a reference drawings data store 118, can provide search results in response to drawing-based search queries. Although the reference drawings are illustrated as being stored in a particular data store, the reference drawings can be stored in any image storage system as long as the storage system allows for indexing a subset of the drawings as the reference drawings.

While a text-based search query is a search query comprised of textual characters naming or textually describing subject matter, a drawing-based search query is a search query comprised of one or more lines graphically depicting or otherwise representing the subject matter. For example, for the text-based search query "hearts," a corresponding drawing-based search query might be a drawing of the shape of a heart. In either case, the subject matter of the queries concerns hearts.

A drawing for a drawing-based search query can be input by a user in a drawing input field of a search page provided by the search system 110 and displayed on a user device 106, e.g., a smartphone. The drawing input field is a free-form input field on the search system's search page that allows users to input various drawing elements such as lines, arcs, points, etc., and combinations thereof, to create a drawing or, more simply, various shapes, objects, characters, or combinations thereof. Thus the user can create a drawing in the drawing input field that is not constrained to one of a number of pre-defined drawings, objects or shapes.

As described above, in some scenarios, a user can create a drawing for a drawing-based search query by sketching or tracing the drawing in the drawing input field with the user's finger, a stylus or another input device. The search system 110, in turn, can identify search results based on the drawing, as described in more detail below reference to FIGS. 2A-D.

Figure 2A:
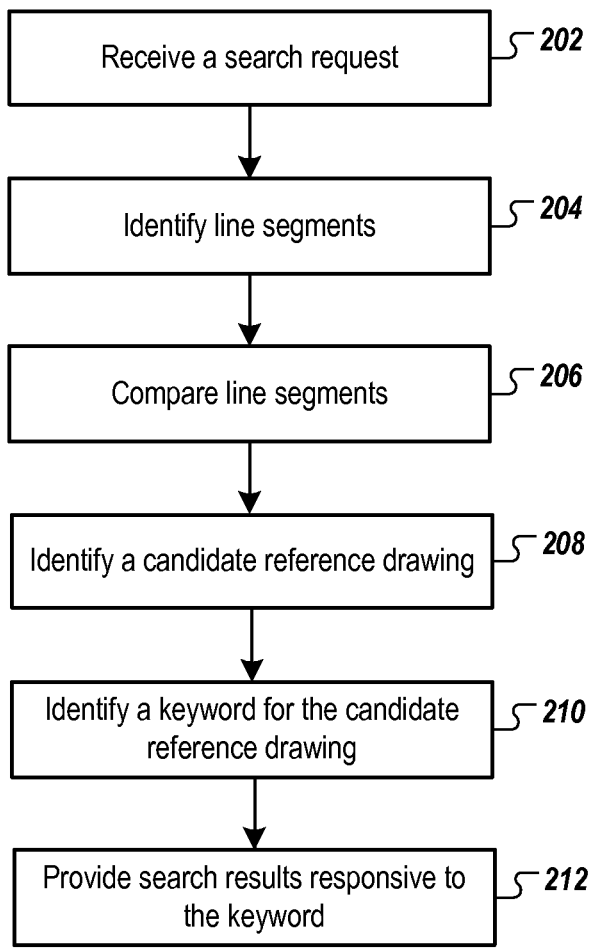
FIG. 2A is a flow diagram of an example process for providing search results responsive to a drawing-based search query.

FIG. 2A is a flow diagram of an example process 200 for providing search results responsive to a drawing-based search query. The process 200 can be implemented in one or more data processing apparatuses in which the search system 110 is implemented.

The process 200 receives search request data specifying a search request (202). In some implementations, the search request is, or includes, a drawing-based search query including a set of line strokes representing a drawing concerning the subject matter of the search query. In other words, the drawing represents the subject matter of the query for which the user submitting the search request desires relevant search results.

More particularly, each line stroke of the drawing represents a trace or a portion of a trace of a moving input point used to create the drawing. For example, a line stroke is a trace of the user's finger across a touchscreen. Thus the line strokes can be straight lines, arcs, combinations thereof, etc. Additionally, line strokes can also represent single point-type inputs such as dots. By way of an example, a search request includes data specifying a drawing represented by a set of line strokes with three straight lines traced by the user where each line end is connected to exactly and only one other line end. As such, the set of line strokes represent a drawing of a triangle. In some implementations, the segment identification apparatus 120 receives the search request data.

Figure 2B:
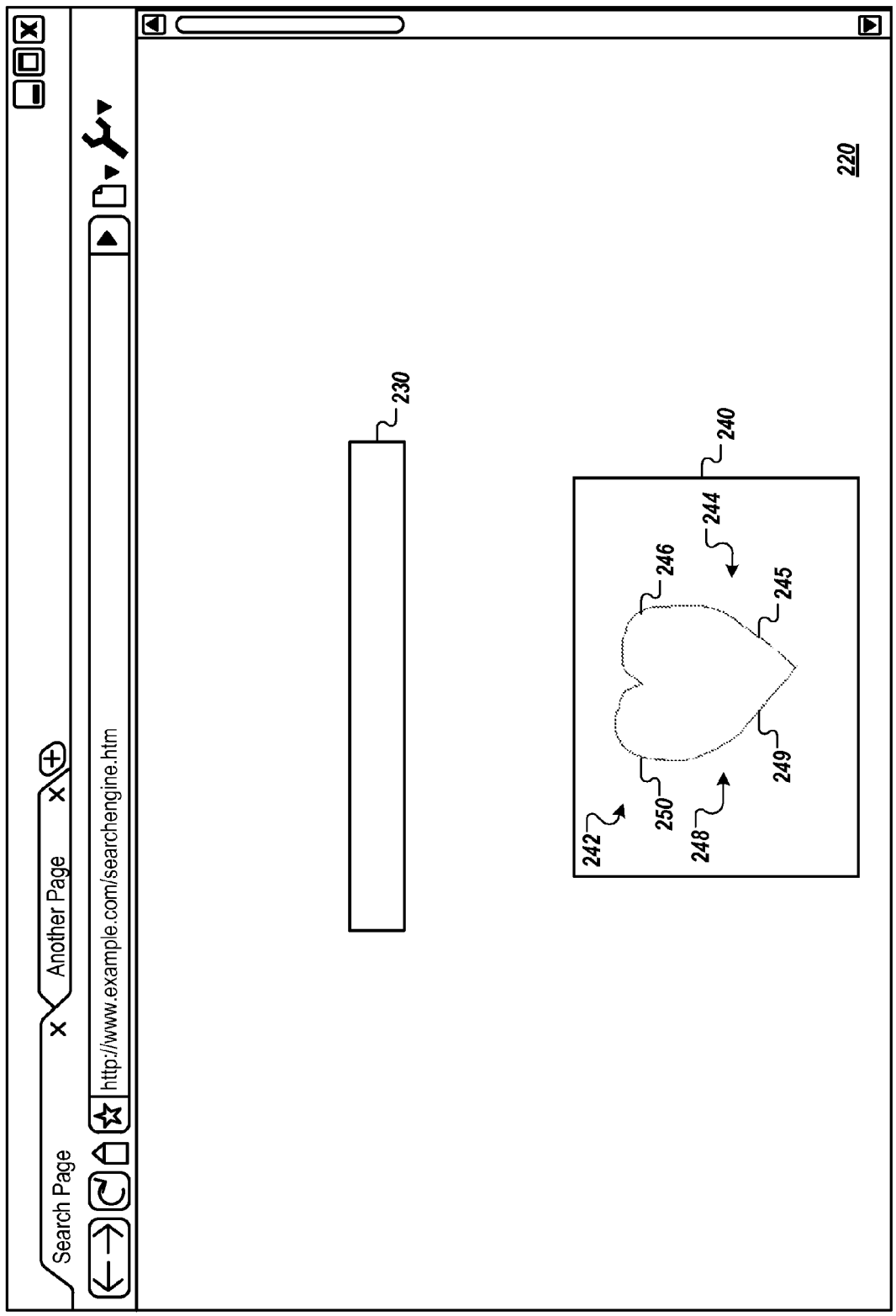
FIG. 2B is a depiction of an example search page with a drawing input field.

As described above the search request can be generated by a user device 106 in response to a user inputting a drawing through a drawing input field in a search page and causing the submission of the corresponding drawing-based search query to the search system 110. One such search page is shown in FIG. 2B, which is a depiction of an example search page 220 with a drawing input field 240.

The search page 220 includes a text input field 230 and a drawing input field 240. The text input field 230 permits users to enter pre-defined textual characters, e.g., keys on a keyboard, to construct a text string for a text-based search query such as "heart." In contrast, the drawing input field 240 is a free-form input field that permits users to draw arbitrary line strokes to construct a drawing for a drawing-based search query 242 such as an outline of a heart. In some implementations, the search page 220 is rendered with both the text input field 230 and the drawing input field 240. However, in other implementations, the search page 220 is rendered only with the text input field 230 but includes an action button (not shown) that upon selection by a user causes the drawing input field 240 to be rendered. In still other implementations, the search page 220 is rendered only with the drawing input field 240 but includes an action button (not shown) that upon selection by a user the text input field 230 to be rendered. Additionally, in some implementations, the user can set search system 110 preference options to render the search page 220 with one or both of the text and drawing input fields 230 and 240, as desired by the user.

As a line stroke is not constrained to a particular shape, length, direction, etc. by the drawing input field 240, beyond the boundaries imposed by the perimeter of the drawing input field itself, the line stroke can be drawn by the user in innumerable ways. Thus for some line strokes, e.g., complex line strokes, the search system 110 discretizes, segments or otherwise characterizes the line strokes to facilitate digital processing of the drawing-based search query as described below.

The process 200 identifies line segments from the line strokes in the set (204). In some implementations, the segment identification apparatus 120 identifies the line segments from the line strokes. Depending on the particular shape of a given line stroke in the drawing, the segment identification apparatus 120 may identify one line segment from the line stroke or may identify multiple line segments from the line stroke, e.g., decompose the line stroke into multiple line segments. For example, for a line stroke corresponding to a short straight line, the segment identification apparatus 120 identifies a single line segment from the line stroke. However, if the lines stroke corresponds to an intricate line, e.g., trace, that includes several straight line portions connected by different arcs with radii changes on a non-linear basis then the segment identification apparatus 120 may identify several line segments from the line stroke.

With respect to the drawing 242, which is a drawing of a heart, the drawing 242 is represented by, for example, two line strokes. More particularly, line stroke 244, which represents the right hand side of the heart, and line stroke 248, which represents the left hand side of the heart. In some implementations, for line stroke 244, the segment identification apparatus 120 may identify two line segments from line stroke 244, line segment 245, which is a straight line, and line segment 246, which is a curved line. Likewise, for line stroke 248, the segment identification apparatus 120 may identify two line segments from line stroke 248, line segment 249, which is a straight line, and line segment 250, which is a curved line.

The identification of line segments from line strokes, or drawings more generally, can be accomplished by various techniques. For example, the segment identification apparatus 120 can identify line segments from a line stroke by decomposing the line stroke into it various building blocks, e.g., straight lines and curved lines. With respect to the above example, the segment identification apparatus 120 decomposed line stroke 244 in its component segments, straight line 245 and curved line 246.

However, the segment identification apparatus 120 can utilize other techniques. In some implementations the segment identification apparatus 120 utilizes a Hough transform to identify the line segments. For example, the segment identification apparatus 120 analyzes the drawing and line strokes to identify and extract drawing features, e.g., line segments, by use of a Hough transform algorithm. In this way the segment identification apparatus 120 identifies drawing features, e.g., line segments, that can be readily processed and manipulated in the digital domain by the search system 110. In some implementations, the segment identification apparatus 120 uses the Hough transform, or another image feature identification and extraction technique, to generate a vector graphics representation of the drawing. A vector graphics representation is a representation of a drawing that characterizes the drawing in terms of its constituent elements, e.g., primitive geometrical elements, such as points, lines and curves, e.g. line segments. Thus, for example, the vector graphics representation represents the drawing as a mathematical expression based on the drawing's line segments. Such a representation can then be used for various drawing analysis operations such as comparing drawings to identify a reference drawing that is similar to a drawing in a drawing-based search query, as described below.

The process 200 compares the identified line segments to reference line segments (206). The reference line segments represent a portion or all of a corresponding reference drawing. In some implementations, the reference drawing identification apparatus 122 compares the identified line segments from the drawing in the drawing-based search query to reference line segments from reference drawings stored in the reference drawing data store 118. The reference drawing identification apparatus 122 can compare the line segments to determine a similarity or dissimilarly measure between the sets of line segments. The reference drawing identification apparatus 122 can then use this measure of similarity or dissimilarly of line segments to determine if the corresponding drawings are similar or not. The similarity measure can be calculated in a variety of ways, e.g., by cosine similarity measures of feature vectors that describe the line segments, by spatial distance measurements, or any other suitable process that can determine a similarity between two sets of line segment drawings.

In some implementations, the reference drawings stored in the reference drawing data store 118 are in a vector graphics representation or another standard image or drawing representation. As such, the reference drawing identification apparatus 122 can compare line segments or drawing features from the drawing in the drawing-based search query to line segments or drawing features more generally from the reference drawings. Because both the drawing in the drawing-based search query, "search query drawing," and the reference drawings are represented in a similar form, whether vector graphics representations or other graphically represented forms, the reference drawing identification apparatus 122 can readily compare the drawings.

The reference drawing identification apparatus 122 uses line segments or other high level drawing features, e.g., as compared to individual pixels or pixel groups, to compare drawings as such a high level feature comparison more readily tolerates differences in the drawings attributable to hand-drawn imprecisions reflected in the search query drawing. For example, a user may sketch a representation of a famous building. However, as the sketch of the building likely is not a perfect representation of the building, as it is hand drawn, a pixel-to-pixel comparison of the building sketch and a digital representation of a professional painting or photograph of the building may not identify the sketch and painting as similar because none or only a limited number of pixels between the sketch and the painting match. Conversely, analyzing higher level features, e.g., line segments, of the sketch and painting may reveal a high degree of similarly even though the pixel analysis, e.g., a micro level analysis, did not because at a macro level the sketch and the painting are similar, e.g., the shape of the building in the sketch and painting are similar, even if at a micro level they are not.

Figure 2C:
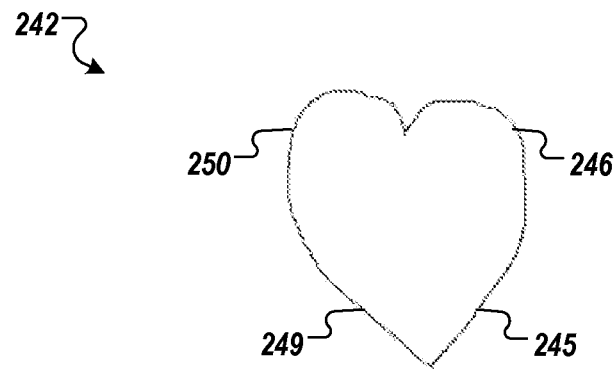
FIG. 2C is a depiction of a search query drawing and a reference drawing.
Figure 2C:
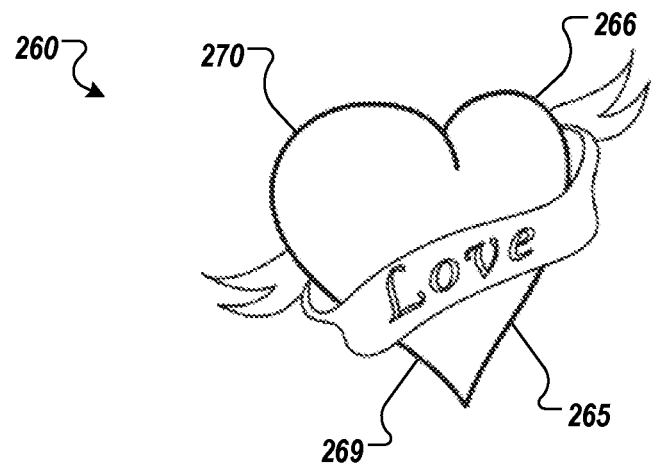
Figure 2D:
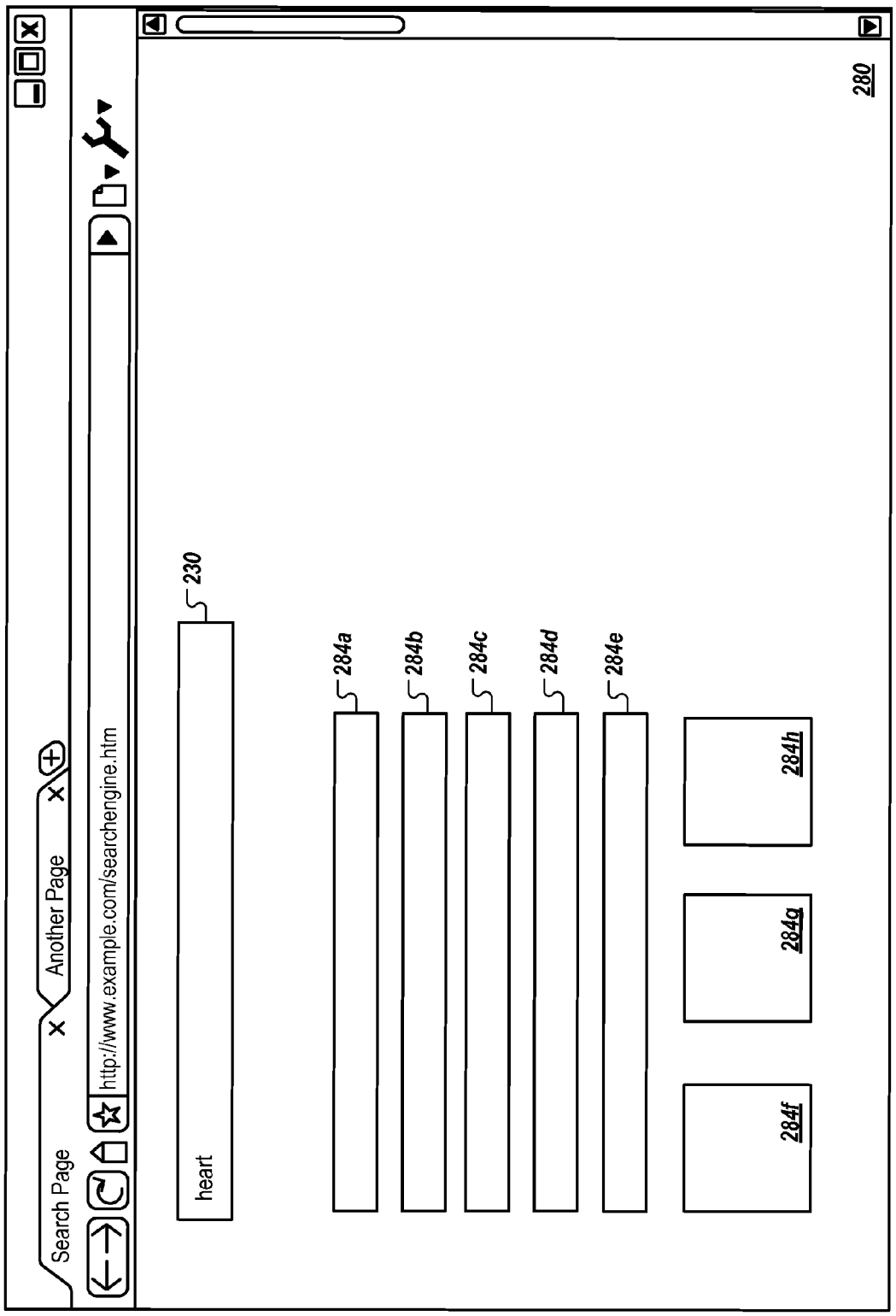
FIG. 2D is a depiction of an example search results page for a drawing-based search query.

The comparison process can further be described with reference to FIG. 2C, which is a depiction of a search query drawing 242 and a reference drawing 260. In some implementations, the process of comparing the line segments from a search query drawing to line segments from reference drawings includes comparing positioning characteristics of the search query drawing line segments with positioning characteristics of the reference drawing line segments. A positioning characteristic specifies a position of a line segment relative to a position of another line segment in the drawing. For example, for search query drawing 242, the positioning data specify that line segment 249 is below and linearly contiguous with line segment 250. In other words, the positioning data specify that the line segments form a continuous line with line segment 249 being the bottom portion of the continuous line and line segment 250 being the top portion of the continuous line.

The reference drawing identification apparatus 122 can use the positioning data to, for example, compare and differentiate between sets of identical or similar line segments based on the positioning of the line segments relative to each other. The reference drawing identification apparatus 122 can then use such information to aid in a determination of similarity or dissimilarity between the line segments' corresponding drawings. For example, the positioning data of the drawing with line segments 245, 246, 249 and 250 specify that the four segments are positioned relative to each other as shown in FIG. 2B, which, to a user, forms the illustration of a heart.

The reference drawing identification apparatus 122 can use the positioning data to determine that two sets of like line segments with similar relative shapes and positionings from two different drawings are similar and, in turn, use such information to determine the similarity or dissimilarity between the corresponding drawings.

In some implementations, the positioning data can be derived from the line segmentation identification process. The reference drawing identification apparatus 122 can generate or identify the positioning data for a search query drawing during the feature, e.g., line segment, identification ad extraction process 206. For example, the positioning data can be determined by the reference drawing identification apparatus 122 as a result of a Hough transform analysis of the search query drawing. Thus the vector graphics representation(s) of the search query drawing generated by the reference drawing identification apparatus 122 can include positioning data for the search query drawing. Similarly, the vector graphics representations of the reference drawings can also include positioning data for the respective reference drawings.

As described above, the reference drawing identification apparatus 122 can utilize the positioning data to facilitate the comparison of line segments from the search query drawing with line segments from the reference drawings. For example, the reference drawing identification apparatus 122 can use the positioning data to compare the relative positions of line segments 249 and 250 from the search query drawing 242 to the line segments 269 and 270 from the reference drawing 260. Thus, for example, the reference drawing identification apparatus 122 can determine the relative positioning of line segment 249 with respect to line segment 250 is similar to the relative positioning of line segment 269 with respect to line segment 270 as line segment 250 is above and in line with line segment 249 and line segment 270 is above and in line with line segment 269. In this way the reference drawing identification apparatus 122 compares both the similarity between line segments from the search query drawing and the reference drawings and their relative positionings.

However, in some scenarios, given large numbers of reference drawings, the comparison process can consume significant search system 110 resources. In such scenarios, the reference drawing identification apparatus 122 can generate fingerprints or other identifiers for the search query drawing, e.g., its line segments, that identify or represent unique or defining characteristics of the search query drawing. The fingerprint(s) of the search query drawing, e.g., its line segments, has a data size less than the data size of the search query drawing or the corresponding line segment(s) that it represents. Likewise, fingerprints of the reference drawings can be generated by the reference drawing identification apparatus 122 and stored in the reference drawing data store 118. The reference drawing identification apparatus 122 can compare the fingerprints of the search query drawing to the fingerprints of the reference drawings to identify similarities between the search query drawing and a reference drawing. Thus the reference drawing identification apparatus 122 can use the fingerprints during the comparison process to reduce the burden on its processing resources, e.g., given the data structure and compact data size of the fingerprints as compared to those of the drawings.

In some implementations, the reference drawing identification apparatus 122 employs a hash function or hash algorithm to generate fingerprints for the drawings, e.g., the line segments. For example, the reference drawing identification apparatus 122 applies a locality-sensitive hash function to the search query drawing to generate one or more fingerprints for the search query drawing and fingerprints for the reference drawings. The reference drawing identification apparatus 122 can use the locality-sensitive hash function not only to generate the fingerprints but also to preserve or represent the positioning data in the fingerprints as the locality-sensitive hash function is locality sensitive. In other words, position information concerning drawing features, e.g., line segments, of the search query and reference drawings can be persevered or represented in their respective fingerprints by use of the locality-sensitive hash function or other similar algorithm. Thus the reference drawing identification apparatus 122 generates the fingerprints to represent not only the drawings but also to represent position information of the features, e.g., line segments, in the drawings.

In some implementations, the reference drawing identification apparatus 122 can generate the fingerprints for the reference drawings in a preprocessing stage such that when the search system 110 receives a search request, the reference drawing identification apparatus 122 only needs to generate fingerprints for the search query drawing for the comparison process as the fingerprints for the reference drawings were previously generated.

The process 200 identifies a candidate reference drawing based on the comparison of the identified line segments with reference line segments representing the candidate reference drawing (208). For example, the reference drawing identification apparatus 122 identifies a candidate reference drawing from the reference drawings stored in the reference drawing data store 118 based on similarities between line segments from the search query drawing and the line segments from the candidate reference drawing. In some scenarios, the candidate reference drawing is the reference drawing being most similar to the search query drawing as determined by the comparison process.

In some implementations, the reference drawing identification apparatus 122 scores the similarity between the search query drawing and one or more reference drawings and identifies one or more reference drawings as candidate reference drawings based on the similarity score(s) for the reference drawing(s) meeting a threshold value. The threshold value can be a predefined value or can be a sliding value based on the similarity scores of the reference drawings. For example, the threshold value may be set to identify the top three most similar references drawings as candidate reference drawings.

In implementations in which fingerprints of the drawings are available or have been generated, in a manner similar to that described above with respect the lines segments, the reference drawing identification apparatus 122 identifies the candidate reference drawing based on similarities between the fingerprints(s) for the search query drawing and the fingerprints for the candidate reference drawing. Once the candidate reference drawing(s) is identified, the reference drawing identification apparatus 122 can identify a textual context for the candidate reference drawing(s) that can be used as an analogous text-based search query for the drawing-based search query. By identifying a relevant textual context to the search query drawing, the reference drawing identification apparatus 122 can leverage existing, robust text-based search query algorithms and processes to identify search results for the drawing-based search query. The identification of relevant textual context for the search query drawing is described below.

The process 200 identifies a keyword for the candidate reference drawing (210). The keyword is a term determined to be relevant to a subject matter of the candidate reference drawing. For example, the reference drawing identification apparatus 122 can identify one or more keywords for the candidate reference drawing by identifying terms in the metadata for the candidate reference drawing and one or more keywords from anchor text from a hyperlink on another resource 105 that links to the candidate reference drawing. Thus if the metadata includes a "Title" for the candidate reference drawing and a resource 105 includes a hyperlink linking to the candidate reference drawing, the reference drawing identification apparatus 122 can identify the term designated as the Title as one possible keyword for the candidate reference drawing and the anchor text from the hyperlink as a second possible keyword. As such, as described below, the reference drawing identification apparatus 122 can identify numerous keywords for a reference drawing.

In some implementations, the reference drawing identification apparatus 122 identifies one or more resources 105 on which the candidate reference drawing is located, e.g., from data in the indexed cache data store 112, identifies terms that appear on the same web page as the candidate reference drawing, e.g., an image or drawing caption for the candidate reference drawing, and identifies these terms as keywords for the candidate reference drawing. For example, if the candidate reference drawing is displayed on a webpage with a caption "heart," the reference drawing identification apparatus 122 can identify the term "heart" as a keyword for the candidate reference drawing.

In some implementations, the reference drawing identification apparatus 122 can identify the terms in search queries for which search results referencing the candidate reference drawing were selected as keywords for the candidate reference drawing. For example, the terms "heart" and "love" may be search query terms for which search results referencing the candidate reference drawing 260 were selected, as determined from an analysis of the query log and click log data stores 114 and 116. As such, the reference drawing identification apparatus 122 can identify "heart" and "love" as keywords for the candidate reference drawing 260. Thus the reference drawing identification apparatus 122 can identify numerous keywords for the candidate reference drawing 260.

In some implementations, the reference drawing identification apparatus 122 selects one of the numerous keywords identified for the candidate reference drawing as the keyword for a text-based search that will be used to provide search results responsive to the drawing-based search query. For example, the reference drawing identification apparatus 122 selects the keyword that is most frequently associated with the candidate reference drawing whether through associations in the metadata, captions in web pages including the candidate reference drawing, search query terms that resulted in selections of search results referencing the candidate reference drawing or combinations thereof, and uses that keyword for the text-based search query.

In another example, the reference drawing identification apparatus 122 uses algorithms such as term frequency-inverse document frequency to weight and rank keywords. The reference drawing identification apparatus 122 can then select the keyword with the highest ranking as the keyword with which to use for the text-based search query. In some implementations, the reference drawing identification apparatus 122 identifies keywords for reference drawings in a pre-processing operation and stores data specifying the keywords and associations between the keywords and respective reference drawings in a data store for later access, e.g., after a search request is received. In still other implementations, data specifying the keywords and their associations to the reference drawings are stored in an indexed data store in an offline process by the search system 110 and the reference drawing identification apparatus 122 accesses the data store and identifies the relevant keyword(s), e.g., in response to a search request, through a "look-up" process based on the reference drawing of interest.

In some implementations, the reference drawing identification apparatus 122 performs a similar process for selecting a keyword from a set of keywords for numerous candidate reference drawings. For example, as described above, the reference drawing identification apparatus 122 can identify multiple candidate reference drawings as being similar to the search query drawing, e.g., within a similarity threshold. The reference drawing identification apparatus 122 ranks the keywords for each these multiple candidate reference drawings and selects the keyword with the highest ranking, e.g., the highest ranked keyword as normalized across keywords for all candidate reference drawings. The reference drawing identification apparatus 122 then submits this highest ranking keyword to the search system 110 for use in a text-based search query for returning search results for the drawing-base search query.

Thus, in some implementations, the reference drawing identification apparatus 122 generates search results responsive to the highest ranked or most frequently associated keyword for the candidate reference drawing(s) as it is the term for which a text-based search will be run to generate search results for the drawing-based search query. This process is described below with reference to FIG. 2D, which is a depiction of an example search results page 280 for a drawing-based search query.

The process 200, in response to receiving the search request, provides search results data specifying search results responsive to the keyword (212). For example, the search system 110 provides a search results page 280 to a user device 106 in response to receiving the search request. For example, search results page 280 shows that the keyword "heart" was identified as the keyword for the candidate reference image 260 in the text put field 230. More particularly, after an analysis of the keywords "heart" and "love" associated with candidate reference image 260, e.g., by one or a combination of the above described techniques, the reference drawing identification apparatus 122 identifies "heart" as the highest ranked keyword for the candidate reference drawing 260. As such, the reference drawing identification apparatus 122 uses "heart" as text-based search query term to submit to the search system 110. In response, the search system 110 generates search results page 280 for presentation on a user device 106 to the user that caused the submission of the drawing-based search query that included search query drawing 242, as, for example, candidate reference drawing 260 was determined to be most similar to search query drawing 242.

Search results page 280 includes eight search results 284*a-h* that are responsive to the text-based search query "heart." Given that "heart" was identified as the highest ranked keyword for the candidate reference drawing 260, which was identified as the most similar reference drawing to search query drawing 242, search results responsive to "heart" are likely responsive to the drawing-based search query that included the search query drawing 242. In some scenarios, the search results include references to textual content from web pages, image search results, other media types, e.g., references to videos or audio files, or combinations thereof.

As described above, in some scenarios, multiple keywords are identified for the candidate reference drawing and ranked. Thus, in some implementations, the search system 110 generates a search results page, e.g., with or without particular search results, that includes numerous identified keywords from which the user can select to cause a text-based search query including the selected keyword to be performed. For example, with reference to candidate reference drawing 260, the search system 110 can generate a search results page that includes the keywords "heart" and "love," as those were the highest ranked keywords for the candidate reference drawing 260. The multiple keywords can be presented to and selectable by the user through an interactive menu such as a drop-down-box or another interactive element. The user can thus select either "heart" or "love," and, in response, the search system 110 will run a text-based search query with the selected keyword and return the relevant search results. This is akin to providing search query suggestions to the user from which the user can select and cause the corresponding text-based search query to be submitted to the search system 110.

Figure 3:
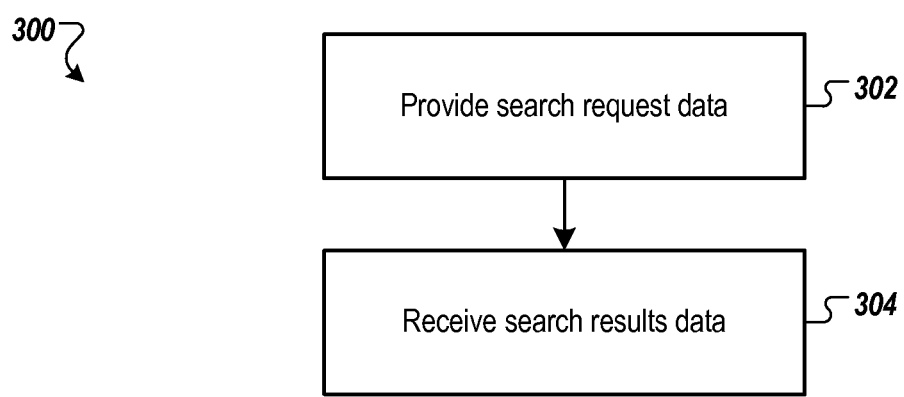
FIG. 3 is a flow diagram of an example process for submitting a drawing-based search query.

Thus, as described above, a user can sketch a search query drawing and cause the submission of a corresponding drawing-based search query to the search system 110, which, in turn, generates a search results page with search results responsive to a keyword for a reference drawing that is similar to the search query drawing. Submission of a drawing-based search query is described below with reference to FIG. 3, which is a flow diagram of an example process 300 for submitting a drawing-based search query.

The process 300 provides search request data specifying a drawing represented by a set of line strokes (302). For example, a user sketches a search query drawing in the drawing input field 240 for a drawing-based search query and causes a user device 106 to provide or submit a search request including the drawing-based search query to the search system 110.

The process 300 receives search results data comprising search results responsive to a keyword for a candidate reference drawing (304). The keyword is a term determined to be relevant to the subject matter of the candidate reference drawing. The candidate reference drawing, in turn, is identified based on a comparison of line segments identified from the line strokes represented the search query drawing with line segments representing portions of the candidate reference drawing. For example, the user device 106 receives the search results responsive to the drawing-based search query from the search system 110, and displays the search results to the user. In this way a user can obtain search results responsive to a search query drawing.

Further, although a sketched search query drawing was described above in detail, the technologies described herein are also applicable to previously generated images, e.g., photographs, provided, uploaded or otherwise submitted to the search system 110.

§4.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA, field programmable gate array, or an ASIC, application specific integrated circuit. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network, "LAN," and a wide area network, "WAN", an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
    receiving search request data specifying a search request, the search request comprising a drawing represented by a set of line strokes, wherein each line stroke represents a trace of a moving input point;
    identifying line segments from the line strokes in the set;
    comparing the identified line segments to reference line segments, wherein each of the reference line segments represents a portion of a corresponding reference drawing;
    identifying, by one or more data processors, a candidate reference drawing based on the comparison of the identified line segments with reference line segments representing the candidate reference drawing;
    identifying a keyword for the candidate reference drawing, wherein the keyword is a term determined to be relevant to a subject matter of the candidate reference drawing;
    in response to receiving the search request data, providing search results data specifying search results responsive to the keyword;
    identifying multiple keywords for the candidate reference drawing;
    providing the multiple keywords for the candidate reference drawing for selection on a search results page;
    receiving user selection of a particular one of the multiple keywords that are provided for selection on the search results page; and
    performing a search using the particular one of the multiple keywords in a search query in response to user selection of the particular one of the multiple keywords.

2. The method of claim 1, wherein comparing the identified line segments to reference line segments comprises:
    comparing positioning characteristics of the identified line segments with positioning characteristics of the reference line segments, wherein a positioning characteristic specifies a position of a first line segment relative to a position of a second line segment.

3. The method of claim 1, wherein comparing the identified line segments to reference line segments comprises:
    generating fingerprint data specifying one or more fingerprints of the drawing, wherein the one or more fingerprints have a data size less than a data size of the drawing and represent defining features of the drawing; and
    comparing the fingerprints of the drawing to fingerprints of the reference drawings.

4. The method of claim 3, wherein generating fingerprint data comprises:
    applying a hash function to data specifying the drawing to generate the fingerprints for the drawing.

5. The method of claim 1, wherein
    identifying a keyword for the candidate reference drawing comprises identifying a plurality of keywords for the candidate reference drawing; and
    in response to receiving the search request, providing search results data comprises ranking each of the plurality of keywords and providing search results data specifying a search result responsive to a keyword of the plurality of keywords with a highest ranking.

6. The method of claim 1, wherein the search results comprise drawings depicting a subject matter of the keyword.

7. The method of claim 1, wherein identifying line segments comprises generating vector graphics image data including data characterizing the set of line strokes.

8. The method of claim 1, wherein the set of line strokes is drawn by a user of a user device sending the search request, wherein the user draws the drawing though use of a drawing input field on a search page presented by the user device.

9. The method of claim 1, wherein identifying a keyword for the candidate reference drawing comprises identifying multiple keywords for the candidate reference drawing in a pre-processing operation prior to receiving the search request data specifying the search request.

10. The computer-implemented method of claim 1, wherein the search results that are responsive to the keyword include textual search results that identify a title of a web page and a portion of text extracted from the web page.

11. The computer-implemented method of claim 1, wherein identifying the keyword for the candidate reference drawing includes identifying the keyword in metadata for the candidate reference drawing.

12. The computer-implemented method of claim 1, wherein identifying the keyword for the candidate reference drawing includes identifying the keyword in anchor text from a web page that links to the candidate reference drawing.

13. The computer-implemented method of claim 1, wherein identifying the keyword for the candidate reference drawing includes identifying that the keyword is a term that appears on a same web page as the candidate reference drawing.

14. The computer-implemented method of claim 1, wherein providing the search results data specifying search results responsive to the keyword is performed without user intervention after receiving the search request data.

15. A system comprising:
    one or more data processors; and
    a computer storage apparatus comprising instructions executable by the one or more data processors which, upon such execution, cause the one or more data processors to perform operations comprising:

receiving search request data specifying a search request, the search request comprising a drawing represented by a set of line strokes, wherein each line stroke represents a trace of a moving input point;

identifying line segments from the line strokes in the set;

comparing the identified line segments to reference line segments, wherein each of the reference line segments represents a portion of a corresponding reference drawing;

identifying a candidate reference drawing based on the comparison of the identified line segments with reference line segments representing the candidate reference drawing;

identifying a keyword for the candidate reference drawing, wherein the keyword is a term determined to be relevant to a subject matter of the candidate reference drawing;

in response to receiving the search request data, providing search results data specifying search results responsive to the keyword;

identifying multiple keywords for the candidate reference drawing;

providing the multiple keywords for the candidate reference drawing for selection on a search results page;

receiving user selection of a particular one of the multiple keywords that are provided for selection on the search results page; and performing a search using the particular one of the multiple keywords in a search query in response to user selection of the particular one of the multiple keywords.

16. The system of claim 15, wherein comparing the identified line segments to reference line segments comprises:

comparing positioning characteristics of the identified line segments with positioning characteristics of the reference line segments, wherein a positioning characteristic specifies a position of a first line segment relative to a position of a second line segment.

17. The system of claim 15, wherein comparing the identified line segments to reference line segments comprises:

generating fingerprint data specifying one or more fingerprints of the drawing, wherein the one or more fingerprints have a data size less than a data size of the drawing and represent defining features of the drawing; and comparing the fingerprints of the drawing to fingerprints of the reference drawings.

18. The system of claim 15, wherein:

identifying a keyword for the candidate reference drawing comprises identifying a plurality of keywords for the candidate reference drawing; and in response to receiving the search request, providing search results data comprises ranking each of the plurality of keywords and providing search results data specifying a search result responsive to a keyword of the plurality of keywords with a highest ranking.

19. The system of claim 15, wherein identifying line segments comprises generating vector graphics image data including data characterizing the set of line strokes.

20. The system of claim 15, wherein identifying a keyword for the candidate reference drawing comprises identifying multiple keywords for the candidate reference drawing in a pre-processing operation prior to receiving the search request data specifying the search request.

21. One or more non-transitory memory devices, including instructions that when executed by one or more data processing apparatuses cause the one or more data processing apparatuses to perform operations comprising:

receiving search request data specifying a search request, the search request comprising a drawing represented by a set of line strokes, wherein each line stroke represents a trace of a moving input point;

identifying line segments from the line strokes in the set;

comparing the identified line segments to reference line segments, wherein each of the reference line segments represents a portion of a corresponding reference drawing;

identifying, by one or more data processors, a candidate reference drawing based on the comparison of the identified line segments with reference line segments representing the candidate reference drawing;

identifying a keyword for the candidate reference drawing, wherein the keyword is a term determined to be relevant to a subject matter of the candidate reference drawing;

in response to receiving the search request data, providing search results data specifying search results responsive to the keyword;

identifying multiple keywords for the candidate reference drawing;

providing the multiple keywords for the candidate reference drawing for selection on a search results page;

receiving user selection of a particular one of the multiple keywords that are provided for selection on the search results page; and performing a search using the particular one of the multiple keywords in a search query in response to user selection of the particular one of the multiple keywords.

22. The one or more non-transitory memory devices of claim 21, wherein the search results comprise drawings depicting a subject matter of the keyword.

23. The one or more non-transitory memory devices of claim 21, wherein providing the search results data specifying search results responsive to the keyword is performed without user intervention after receiving the search request data.

24. A computer implemented method, comprising:

receiving search request data specifying a search request, the search request comprising a drawing represented by a set of line strokes, wherein each line stroke represents a trace of a moving input point;

identifying line segments from the line strokes in the set;

comparing the identified line segments to reference line segments, wherein each of the reference line segments represents a portion of a corresponding reference drawing;

identifying, by one or more data processors, a candidate reference drawing based on the comparison of the identified line segments with reference line segments representing the candidate reference drawing;

identifying a keyword for the candidate reference drawing, wherein the keyword is a term determined to be relevant to a subject matter of the candidate reference drawing, wherein identifying the keyword for the candidate reference drawing includes identifying a keyword that was assigned to the candidate reference drawing because the keyword was used as a term in a search query for which the candidate reference drawing was presented as a search result and selected by user input upon presentation as the search result; and in response to receiving the search request data, providing search results data specifying search results responsive to the keyword.

25. The computer-implemented method of claim 24, wherein providing the search results data specifying search results responsive to the keyword is performed without user intervention after receiving the search request data.

26. One or more non-transitory memory devices, including instructions that when executed by one or more data processing apparatuses cause the one or more data processing apparatuses to perform operations comprising:

receiving search request data specifying a search request, the search request comprising a drawing represented by a set of line strokes, wherein each line stroke represents a trace of a moving input point;

identifying line segments from the line strokes in the set;

comparing the identified line segments to reference line segments, wherein each of the reference line segments represents a portion of a corresponding reference drawing;

identifying, by one or more data processors, a candidate reference drawing based on the comparison of the identified line segments with reference line segments representing the candidate reference drawing;

identifying a keyword for the candidate reference drawing, wherein the keyword is a term determined to be relevant to a subject matter of the candidate reference drawing, wherein identifying the keyword for the candidate reference drawing includes identifying a keyword that was assigned to the candidate reference drawing because the keyword was used as a term in a search query for which the candidate reference drawing was presented as a search result and selected by user input upon presentation as the search result; and in response to receiving the search request data, providing search results data specifying search results responsive to the keyword.

27. The one or more non-transitory memory devices of claim 26, wherein providing the search results data specifying search results responsive to the keyword is performed without user intervention after receiving the search request data.

* * * * *